US010093420B2

(12) United States Patent
Seibt

(10) Patent No.: US 10,093,420 B2
(45) Date of Patent: Oct. 9, 2018

(54) LAVATORY ARRANGEMENT FOR A VEHICLE CABIN AND VEHICLE HAVING A VHICLE BODY, AND A CABIN HAVING A LAVATORY ARRANGEMENT INSTALLED THEREIN

(71) Applicant: Airbus Operations GmbH, Hamburg (DE)

(72) Inventor: Christian Seibt, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 351 days.

(21) Appl. No.: 14/978,106

(22) Filed: Dec. 22, 2015

(65) Prior Publication Data
US 2016/0176525 A1 Jun. 23, 2016

(30) Foreign Application Priority Data
Dec. 23, 2014 (EP) .................................. 14200164

(51) Int. Cl.
*B64D 11/02* (2006.01)
*B60R 15/00* (2006.01)
*B60R 15/02* (2006.01)
*B60R 15/04* (2006.01)

(52) U.S. Cl.
CPC .............. *B64D 11/02* (2013.01); *B60R 15/00* (2013.01); *B60R 15/02* (2013.01); *B60R 15/04* (2013.01)

(58) Field of Classification Search
CPC ......... B64D 11/02; B60R 15/04; B60R 15/00; B60R 15/02
See application file for complete search history.

(56) References Cited

U.S. PATENT DOCUMENTS

| 7,866,603 B2 * | 1/2011 | Cooper ................... B64D 11/02 244/117 R |
| 9,708,062 B2 * | 7/2017 | Grant ...................... B64D 11/02 |
| 2012/0261509 A1 | 10/2012 | Grant et al. |
| 2014/0359934 A1 | 12/2014 | Schliwa et al. |

FOREIGN PATENT DOCUMENTS

| EP | 2411273 B1 | 3/2013 |
| WO | 2013125230 A1 | 8/2013 |
| WO | 2014154758 A1 | 10/2014 |

OTHER PUBLICATIONS

European Patent Office, European Search Report for European Patent Application No. 14200164.3 dated Sep. 6, 2015.

* cited by examiner

*Primary Examiner* — Brian M O'Hara
(74) *Attorney, Agent, or Firm* — Lorenz & Kopf, LLP

(57) ABSTRACT

A lavatory arrangement for a vehicle cabin comprises a lavatory housing defining an inner space having an entrance opening, a floor and a first lateral delimitation, a toilet arranged adjacent to the first lateral delimitation, having a front end and a back end and defining a first plane spanned by a longitudinal direction of the toilet and a first axis vertical to the floor, a wash table arranged at the first lateral delimitation. The wash table has a horizontal surface and a lining arrangement extending from the horizontal surface in the direction to the floor, thereby creating a wash table lining surface, the lining arrangement comprises an indentation in a region facing to the toilet, in which indentation the lining arrangement is indented in a direction facing away from the first plane.

20 Claims, 3 Drawing Sheets

LAVATORY ARRANGEMENT FOR A VEHICLE CABIN AND VEHICLE HAVING A VHICLE BODY, AND A CABIN HAVING A LAVATORY ARRANGEMENT INSTALLED THEREIN

CROSS-REFERENCE TO RELATED APPLICATIONS

This application claims priority to European Patent Application No. 14 200 164.3, filed Dec. 23, 2014, which is incorporated herein by reference in its entirety.

TECHNICAL FIELD

This relates to a lavatory arrangement for a vehicle cabin and a vehicle having a vehicle body and a cabin having a lavatory arrangement installed therein.

BACKGROUND

Lavatories in vehicle cabins often comprise a toilet and a wash table arranged on two adjacent walls, wherein an opening of the lavatory arrangement is often positioned at an opposed end of the toilet. For increasing the compactness of lavatory arrangements, different approaches are known. For example, EP 2 411 273 B1 shows a convertible monument, which is extendable into a region of a cabin door, such that a lavatory arrangement inside the monument comprises a compacted (unusable) and an expanded (usable) state.

SUMMARY

It is an object of the embodiments described herein to propose a lavatory arrangement for a vehicle cabin, that provides an increased compactness in comparison with known lavatory arrangements without influencing the usability and comfort for a passenger.

A lavatory arrangement for a vehicle cabin is proposed, the lavatory arrangement comprising a lavatory housing defining an inner space having an entrance opening, a floor and a first lateral delimitation, a toilet arranged adjacent to the first lateral delimitation, having a front end and a back end and defining a first plane spent by a longitudinal direction of the toilet and a first axis vertical to the floor, and a wash table arranged at the first lateral delimitation. The wash table has a horizontal surface and a lining arrangement extending from the horizontal surface in the direction to the floor, thereby creating a wash table lining surface. The lining arrangement comprises an indentation in a region facing to the toilet, in which indentation the lining arrangement is indented in a direction facing away from the first plane. The indentation comprises a contour, which has a mainly horizontal section that at least partially follows the horizontal extension direction of the toilet forward from the front end into the direction of the back end of the toilet, which mainly horizontal section bends into a mainly vertical section arranged in a forward direction relative to the toilet, so as to provide leg room for a downwardly bent leg of a user, which is sitting on the toilet, positioned between the toilet and the wash table lining surface.

The lavatory housing particularly defines the usable installation space inside the lavatory arrangement and may comprise a set of walls, a frame, a framework or any other means that allows delimiting the inner space inside the housing. It is not necessary that the lavatory housing comprises straight or planar walls, instead, it may always be feasible to provide walls with kinks or bends in any direction, depending on the available space for the lavatory housing and the requirements regarding passenger comfort. It goes without saying that particularly for aircraft installations, the lavatory housing should comply with all certification requirements as well as comprise a particularly low weight. For the purpose of an improved load introduction, several fixation points may be prepared to allow the integration of all required components.

Through the entrance opening, a passenger may reach the inner space by stepping on its floor. Inside the inner space, a toilet as well as a wash table are arranged here, the wash table is arranged at a first delimitation adjacent to the toilet and vice versa. This means that a passenger, who sits on the toilet, will see the first delimitation at his right or left side, irrespective of where the entrance opening is situated.

While the outer dimensions of the lavatory housing may be chosen as compact as possible, the installation space inside the lavatory housing is strictly limited. Hence, the wash table, which clearly protrudes into the inner space, may not be placed very far from the toilet. However, since the entrance opening should comprise a sufficient size for entering the inner space, the wash table at the other end should not obstruct the entrance opening, such that a passenger cannot enter the inner space. Consequently, the wash table and a lining arrangement that extends from a horizontal surface of the wash table into a downward direction may be positioned very near to the toilet.

The lining arrangement provides a smooth and pleasant appearance and as well hides installation equipment that is required for a smooth operation of equipment in the lavatory arrangement.

For allowing a passenger to sit on the toilet without feeling cramped, an indentation is provided in the lining arrangement. A core aspect of the indentation lies in its contour, which basically follows the contour of the leg of a user that sits on the toilet. Hence, a horizontal section as well as a vertical section follow the upper and lower part of the leg and hence fulfils ergonomic requirements even when the wash table clearly extends into a required operation area of the toilet.

The indentation is further extending underneath the horizontal surface, which comprises a height above the floor that would leave a sufficient space to install a washbasin, which is located at least partially above the respective indentation.

The contour of the indentation should be designed as smooth as possible to avoid the creation of sharp or prominent edges, to minimize injure risks.

A great advantage lies in maintaining the full usability of a wash table with common dimensions, which not only allow to integrate a wash basin, but also allows to provide a placement space on the horizontal surface.

Particularly narrow/slim lavatories are possible through the lavatory arrangement according to an embodiment. The outer dimensions may comprise a strong compactness and the equipment installed in the lavatory arrangement a high level of integration, such that the cabin of the vehicle provides an improved utilization degree, a higher number of seats and, consequently, improved profitability. However, the compact lavatory arrangement may also be present in larger lavatories, such as in a first or business class cabin, which allow to include further equipment such as a bench, a urinal, a bidet or other.

Altogether, the lavatory arrangement as described above enables a clearly reduced distance from the first delimitation to the toilet, without a reduction in functionality and without reducing the passenger comfort inside the lavatory.

An ultra compact arrangement of toilet and wash table, which fulfills hygienic and ergonomic requirements is created through using the above mentioned indentation. The size and position of the indentation depends on the spatial arrangement of the wash table and the toilet.

It is preferred that a distance between the wash table to a front end of the toilet is chosen such that the clothes of a user, who stands in front of the wash table and uses a wash basin in the wash table, should not touch the toilet.

Vice versa, the clothes of a user, who stands in front of the toilet should not touch the wash table or a region of the wash table, which may be wet after usage of a wash basin arranged therein.

In an analogous manner, a distance between the longitudinal axis and the first lateral delimitation should be sufficient for avoiding that shoulders of a user, who sits on the toilet, gets up from the toilet or stands in front of it, touch the first lateral delimitation. It is clear that this may be applicable regarding other equipment installed therein.

A distance between the knees and legs of a user to the wash table and the lining arrangement of the wash table, i.e. the inward surface or base area of the indentation, should allow to get up ergonomically from the toilet. Handles for improving this motion may be included into the lavatory arrangement, and toilet paper should be arranged in a reachable distance.

In this regard, the user mentioned above and below may have dimensions equal to a 95 percentile person, e.g. from the United States.

In an advantageous embodiment, the lavatory arrangement comprises a second lateral delimitation, which is directly opposed to the first lateral delimitation, wherein the toilet is arranged between the first lateral delimitation and the second lateral delimitation. In this setup, the toilet is located e.g. at a back wall of the lavatory housing, to which the first and second lateral delimitations adjoin. This allows installing the lavatory housing in a narrow niche or allow its use in a modular way, for example in a multifunctional monument setup, which may also include galley modules.

In this regard it is stressed that the first and second delimitations do not necessarily need to be walls, which are arranged parallel to each other. In fact, the distance between the first and second delimitation may be clearly reduced at a back end or a back wall in the lavatory housing, when the first and second delimitations are arranged at an angle to each other, i.e. not parallel and not necessarily vertical to a third delimitation, such as a back or a front wall of the lavatory housing. For example, the lavatory housing may comprise a tapering floor contour, such that two similarly designed lavatory housings may arranged adjacent to each other in opposed directions.

In a still further exemplary embodiment, the inner distance between the first lateral delimitation and the second lateral delimitation in a region intersecting with the toilet, e.g. along its front end, a middle portion, a back end or along the top surface of the toilet, may be less than 75 cm. Due to the application of the above-mentioned features, the region where the toilet is arranged may be realized in an extremely narrow fashion, leading to a drastic reduction of necessary installation space and therefore allows to include other installations into the cabin. However, the indentation may also be used for wider lavatory housings. Particularly, the indentation allows an improved longitudinal overlap, i.e. an improved staggering in a lateral direction.

In the lavatory arrangement, the horizontal surface of the wash table may protrude over the indentation in a direction facing away from the first lateral delimitation. If a common height of a worktop defined by the horizontal surface is chosen, there may be enough room underneath the horizontal surface to provide for the ergonomic indentation without a risk of being cramped between the wash table and the toilet when standing up. The functionality of the wash table therefore is not downgraded in comparison of common wash tables.

Still further, the lavatory arrangement may include water supply and/or removal equipment, which is installed behind the lining arrangement in a space between the horizontal surface, the indentation contour and an outer delimitation of the lining arrangement facing away from the toilet. Water supply and/or removal equipment may comprise different installations, such as lavatory water supply system for low water consumption applications, such as through a faucet at the wash table, which may be coupled with a thermostat that allows maintaining a required temperature, which may be limited at exemplarily 40° C. Various different setups, which include mechanical or electronic means, are feasible. Also, this may include a water heater, which provides a heating function by a flow-through of water. Control devices, indicators and other peripheral devices as well as water removal equipment fall into this group of installations.

As indicated above, the lavatory arrangement may comprise a water heater, which is installed behind the lining arrangement in a space between the horizontal surface, an outer delimitation of the lining arrangement facing away from the toilet and the mainly vertical section of the indentation contour. As the water heater installation may be a larger compared to a thermostat or a faucet, it requires a larger installation space. However, this may be provided particularly at a center or lower region of the lining arrangement.

Another advantageous embodiment further comprises at least one holder for toilet paper, which is installed in the lining arrangement in a space between the horizontal surface, an outer delimitation of the lining arrangement facing away from the toilet and the mainly vertical section of the indentation contour. As the wash table is placed nearer to the toilet than in common lavatory arrangements, the holder may be easily reached even when it is placed near an outer delimitation facing away from the toilet.

The horizontal surface comprises a curved shape defining a depth of the horizontal surface in relation to the first delimitation, which depth increases in a direction facing away from the toilet up to a maximum. The washbasin may therefore be integrated in a region around the maximum depth, leaving enough space in lateral regions to the washbasin to introduce further equipment, such as a faucet, a soap dispenser etc.

To further increase the compactness of the lavatory arrangement, the indentation may extend along a part of the longitudinal extension of the toilet, which may be at least one quarter of a longitudinal extension of the toilet.

In an advantageous embodiment of the lavatory arrangement, the wash table comprises a placement space. This allows a user to temporarily place personal items. The placement space may be arranged on the horizontal surface. It may further be placed in a region that extends along the toilet. The placement space may comprise a size, which is comparable with common placement spaces in larger lavatory arrangements or with larger wash tables.

The lavatory arrangement may comprise a handle, which is distanced to the horizontal surface above an end region of the wash table that faces away from the toilet. The placement of the handle directly adjacent to the toilet is not necessary, as the distance to the end region opposed to the toilet is still near enough to reach the handle.

Finally, the entrance opening may be directly opposed to the toilet and may directly adjoins an end region of the wash table that faces away from the toilet. The lavatory arrangement may therefore be installed into a rather short lavatory housing, while there is no ergonomic limitation. For such a compact lavatory arrangement, the entrance opening may particularly be closable by means of a bi-fold door.

An embodiment also relates to a cabin of a vehicle, comprising a plurality of passenger seats and at least one of the above defined lavatory arrangements. Through using the lavatory arrangement according to the embodiment, the number of installed passenger seats may be increased, due to the reduced space requirement for the lavatory arrangement.

For example, the lavatory arrangement may be placed inside a lavatory module, which may be positioned in a monument having at least one galley module. This provides an additional functionality in a large monument without the need for excessive space.

Also provided is an aircraft comprising a fuselage having an above defined cabin.

BRIEF DESCRIPTION OF THE DRAWINGS

The various embodiments will hereinafter be described in conjunction with the following drawing figures, wherein like numerals denote like elements, and.

DETAILED DESCRIPTION

The following detailed description is merely exemplary in nature and is not intended to limit the disclosed embodiments or the application and uses thereof. Furthermore, there is no intention to be bound by any theory presented in the preceding background detailed description.

Figure 1:
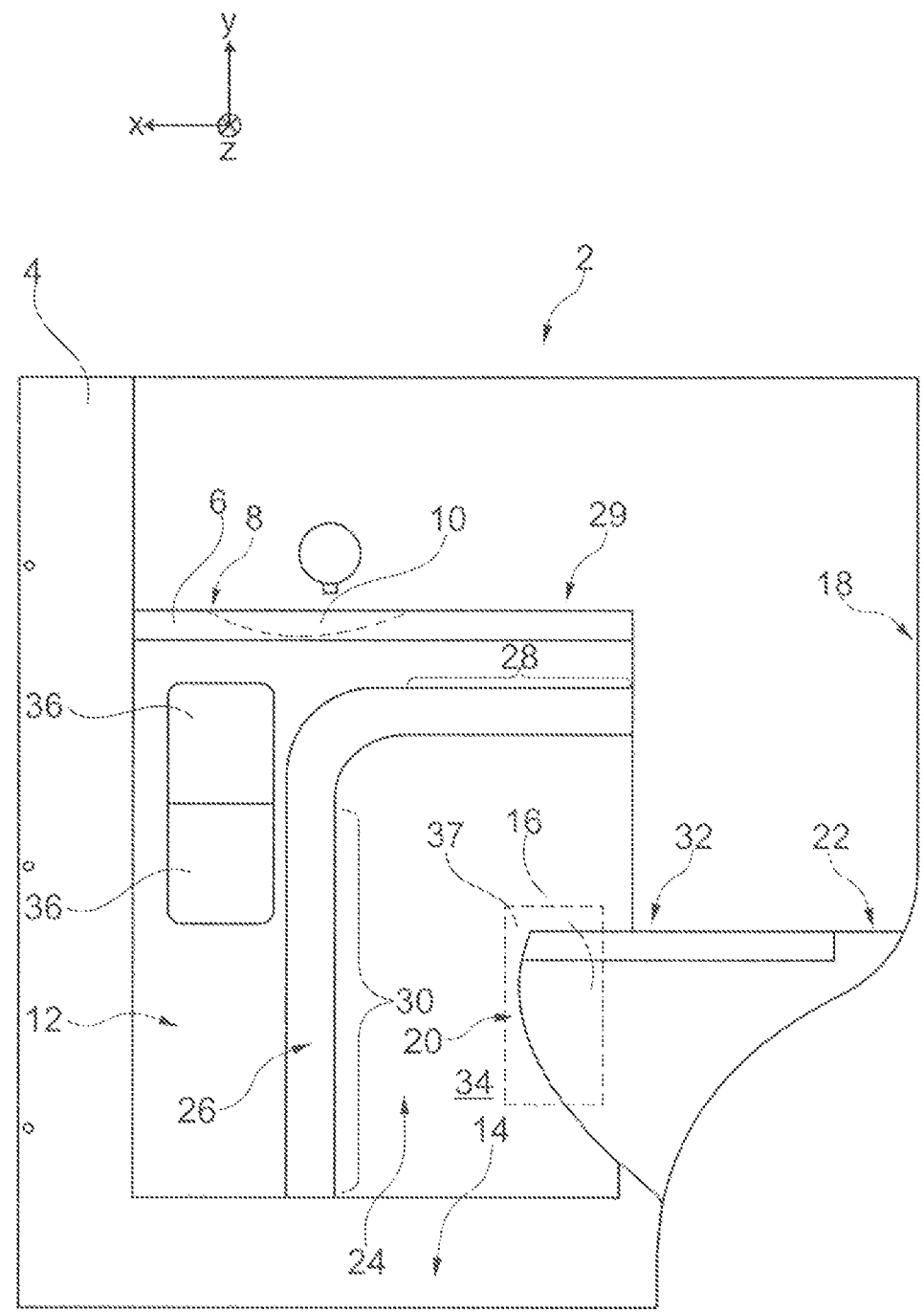
FIG. 1 shows a lateral view of the lavatory arrangement.

FIG. 1 shows a lateral view of a lavatory arrangement 2 in an aircraft. In the viewing plane, which is defined by a horizontal x-axis and a vertical y-axis just for clarification of the drawings and not coinciding with a vehicle coordinate system, a first delimitation 4 is shown, to which a wash-table 6 is attached. The wash-table 6 comprises a horizontal surface 8, into which a wash-basin 10 is integrated. In order to provide a pleasant and smooth appearance, a lining arrangement 12 extends from the horizontal surface 8 into a downward direction, i.e. to a floor 14 in a negative y-direction according to the above mentioned coordinate system.

In the viewing plane on the right side, a toilet 16 is shown, which extends from a rear delimitation 18 into a inner space of the lavatory arrangement 2. The toilet 16 comprises a front end 20 and a back end 22, wherein the front end 20 clearly protrudes along the lining arrangement 12. A person sitting on the toilet 16 would feel disturbed, cramped or somehow constricted when the distance between the toilet 16 and the lining arrangement 12 is too small. However, an indentation 24 is present, which is indented into the direction of the first lateral delimitation, i.e. into a z-direction according to the above-mentioned coordinate system, along a contour 26, which exemplarily comprises a reverse L-shape.

The contour 26 comprises a mainly horizontal section 28 and a mainly vertical section 30, wherein the mainly horizontal section 28 bends into the mainly vertical section 30. The distance from the front end 20 of the toilet 16 to the mainly vertical section 30 as well as the distance from a top end 32 of toilet 16 to the mainly horizontal section 28 are chosen such that a sufficient leg room for a downwardly bent leg of a user, which is sitting on the toilet 16, is provided. Hence, a base surface 34, which, together with the contour 26 defines the indentation 24, therefore comprises a clearly larger distance to the toilet 16 in the z-direction, i.e. a clearly larger distance to a first plane 37 spanned by the x- and y-axis and placed along a longitudinal extension of the toilet 16, than the remaining part of the lining arrangement 12. This allows moving the wash-table 6 further into in an inward direction of the lavatory assembly 2. Thus, the compactness of the lavatory arrangement 2 is clearly increased. This leads to the ability to provide an improved longitudinal overlap in an x-direction such that the wash-table 6 and the indentation 24 arranged underneath may extend along at least a third of the toilet 16 from the front end 20 to into the direction of the back end 22.

Equipment necessary for the operation of the lavatory arrangement 2, such as water supply devices, water heaters, waste water equipment, a thermostat, a control device etc. may be installed behind a region of the lining arrangement 12 adjacent to the indentation 24.

Due to the fact that a distance between the horizontal surface 8 of the wash-table 6 and the mainly horizontal section 28 of the contour 26 is clearly above zero, the wash basin 10 is installable into the wash-table 6 and may also reach into a region above the indentation 24. Hence, neither the functionality nor the comfort and uncramped feeling of a user are disturbed.

Toilet roll holders 36 may be introduced into the bulkier section adjacent to the indentation 24 below the horizontal surface 8, which comprises a sufficient installation space. Due to the reduced extension of the wash-table 6 in an x-direction relative to the toilet 16, the toilet roll holders 36 are easily reachable by a user, who is sitting on the toilet 16.

Exemplarily, the distance between the floor 14 and the mainly horizontal section 28 of the contour 26 may be around 55 to 70 centimeters, thereby providing sufficient leg room and sufficient installation space for the wash-basin 6, which extends up to a height of exemplarily 85 to 95 centimeters.

Figure 2:
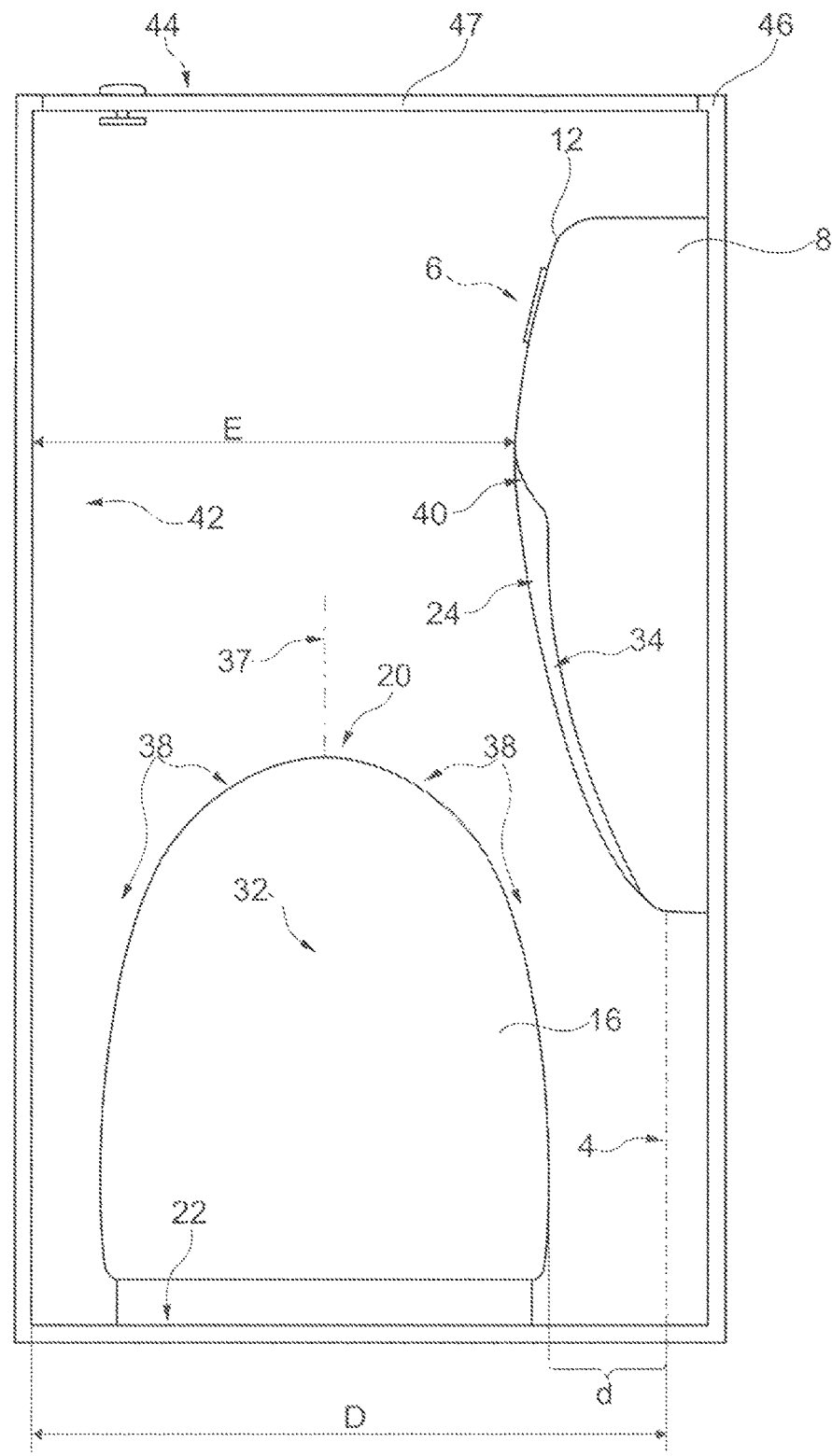
FIG. 2 shows a top view of the lavatory arrangement.

In FIG. 2, a top view of the lavatory arrangement 2 is shown. Here, the spatial relationship between the toilet 16 and the wash-table 6 are more visible. The distance between a lateral face 35 of the toilet 16 and the first lateral delimitation 4, indicated by d, is comparably small and may exemplarily be in a range of 15 to 25 centimeters. Through providing the indentation 24 underneath the horizontal surface 8 of the wash-table 6, sufficient leg room is still provided.

A still further advantage of the indentation 24 is the fact that a toilet shroud 38 may be easily removed without prior disassembly of the lining arrangement 12 of the wash-table 6. Through providing a curved front face 40 of the wash table 6, which tapers in the direction toward the toilet 16, it may be prevented that a user accidently hits the wash-table 6 with his elbow. Further, smoothly tapering the lining arrangement 12 allows providing a pleasant appearance and generally reduces any injury risks.

Exemplarily, an inner distance D in a region of the toilet may be as small as 60 centimeters, but clearly below 75 centimeters, while the minimum distance between the front face 40 of the wash-table 6 and an opposed second lateral delimitation 42, indicated by E, may be as small as 40 to 50 centimeters. As indicated above, much wider lavatory housings may be used.

An entrance opening 44 may be arranged in a front wall 46 directly adjacent the wash table 6 and extending to the second lateral delimitation 42. The resulting lavatory arrangement 2 is extremely compact and requires much less installation space than common lavatory arrangements.

Figure 3:
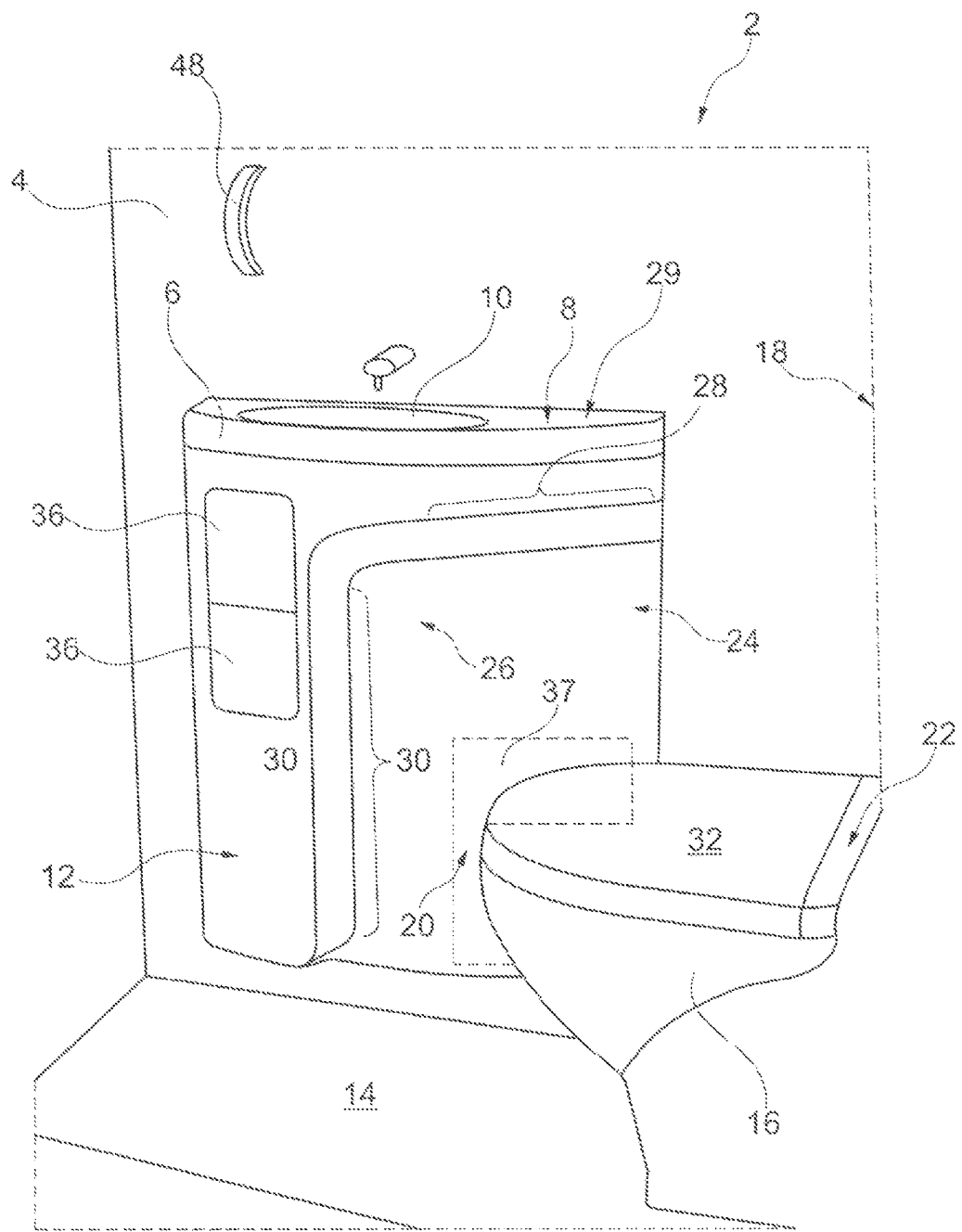
FIG. 3 shows a three-dimensional view of the lavatory arrangement.

Finally, FIG. 3 shows a three-dimensional view of the lavatory arrangement 2, in which the contour 26 is shown as spatially rounded. Further, a handle 48 is depicted, which is arranged at an end region of the wash-table 6 opposite to the toilet 16. Due to the decreased extension of the wash-table 6 relative to the toilet 16, the handle 48 is easily reachable, as it is only as far away as the toilet roll holders 36. It is further visible that the wash table 6 may comprise standard dimensions, which allow the integration of a placement space next to the wash basin, such as in the region of the wash table 6 that overlaps with the longitudinal extension of the toilet 16.

In addition, it should be pointed out that "comprising" does not exclude other elements or steps, and "a" or "an" does not exclude a plural number. Furthermore, it should be pointed out that characteristics or steps which have been described with reference to one of the above exemplary embodiments can also be used in combination with other characteristics or steps of other exemplary embodiments described above. Reference characters in the claims are not to be interpreted as limitations.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the embodiment in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the embodiment as set forth in the appended claims and their legal equivalents.

What is claimed is:

1. A lavatory arrangement for a vehicle cabin, comprising:
   a lavatory housing defining an inner space having an entrance opening, a floor and a first lateral delimitation;
   a toilet arranged adjacent to the first lateral delimitation, the toilet having a front end and a back end, wherein a first vertical plane is defined by a longitudinal direction of the toilet and a first axis vertical to the floor;
   a wash table arranged at the first lateral delimitation;
   wherein the wash table has a horizontal surface and a lining arrangement extending from the horizontal surface in a direction toward the floor, thereby creating a wash table lining surface,
   wherein the lining arrangement comprises an indentation in a region facing the toilet, and the lining arrangement is indented in a direction facing away from the first vertical plane into a space underneath the wash table, and
   wherein the indentation is created in a base surface of the lining arrangement and is delimited by a contour comprising a reverse L-shape, which has a substantially horizontal section that at least partially follows a horizontal extension direction of the toilet in a vertical upward direction relative to the toilet and from the front end toward the back end of the toilet, which substantially horizontal section bends into a mainly vertical section arranged in a forward direction relative to the toilet, providing leg room in form of the indentation for a downwardly bent leg of a user sitting on the toilet, positioned between the toilet and the wash table lining surface.

2. The lavatory arrangement of claim 1, further comprising a second lateral delimitation, which is directly opposed to the first lateral delimitation, wherein the toilet is arranged between the first lateral delimitation and the second lateral delimitation.

3. The lavatory arrangement of claim 1, wherein the inner distance between the first lateral delimitation and the second lateral delimitation in a region along intersecting with the toilet is less than 75 cm.

4. The lavatory arrangement of claim 1, wherein the horizontal surface of the wash table protrudes over the indentation in a direction facing away from the first lateral delimitation.

5. The lavatory arrangement of claim 1, further comprising a water supply and/or removal equipment, which is installed behind the lining arrangement in a space between the horizontal surface, the indentation contour and an outer delimitation of the lining arrangement facing away from the toilet.

6. The lavatory arrangement of claim 1, further comprising a water heater, which is installed behind the lining arrangement in a space between the horizontal surface, an outer delimitation of the lining arrangement facing away from the toilet, and the mainly vertical section of the indentation contour.

7. The lavatory arrangement of claim 1, further comprising at least one holder for toilet paper, which is installed in the lining arrangement in a space between the horizontal surface, an outer delimitation of the lining arrangement facing away from the toilet and the mainly vertical section of the indentation contour.

8. The lavatory arrangement of claim 1, wherein the horizontal surface comprises a curved shape defining a depth of the horizontal surface in relation to the first delimitation, which depth increases in a direction facing away from the toilet up to a maximum.

9. The lavatory arrangement of claim 1, wherein the indentation extends along a part of a longitudinal extension of the toilet.

10. The lavatory arrangement of claim 1, wherein the wash table comprises a placement space.

11. The lavatory arrangement of claim 1, further comprising a handle distanced to the horizontal surface above an end region of the wash table that faces away from the toilet.

12. The lavatory arrangement of claim 1, wherein the entrance opening is directly opposed to the toilet and directly adjoins an end region of the wash table that faces away from the toilet.

13. A cabin of a vehicle, comprising:
   a plurality of passenger seats; and
   at least one lavatory arrangement comprising:
      a lavatory housing defining an inner space having an entrance opening, a floor and a first lateral delimitation;
      a toilet arranged adjacent to the first lateral delimitation, the toilet having a front end and a back end, wherein a first vertical plane is defined by a longitudinal direction of the toilet and a first axis vertical to the floor; and
      a wash table arranged at the first lateral delimitation;

wherein the wash table has a horizontal surface and a lining arrangement extending from the horizontal surface in a direction toward the floor, thereby creating a wash table lining surface, wherein the lining arrangement comprises an indentation in a region facing the toilet, and the lining arrangement is indented in a direction facing away from the first vertical plane into a space underneath the wash table, and wherein the indentation is created in a base surface of the lining arrangement and is delimited by a contour comprising a reverse L-shape, which has a substantially horizontal section that at least partially follows a horizontal extension direction of the toilet in a vertical upward direction relative to the toilet and from the front end toward into the direction of the back end of the toilet, which substantially horizontal section bends into a mainly vertical section arranged in a forward direction relative to the toilet, providing leg room in form of the indentation for a downwardly bent leg of a user sitting on the toilet, positioned between the toilet and the wash table lining surface.

14. The cabin of claim 13, wherein the lavatory arrangement is placed inside a lavatory module positioned in a monument having at least one galley module.

15. An aircraft, comprising:
a fuselage; and
a cabin in the fuselage, the cabin comprising:
 a plurality of passenger seats; and
 at least one lavatory arrangement comprising:
  a lavatory housing defining an inner space having an entrance opening, a floor and a first lateral delimitation;
  a toilet arranged adjacent to the first lateral delimitation, the toilet having a front end and a back end, wherein a first vertical plane is defined by a longitudinal direction of the toilet and a first axis vertical to the floor; and
  a wash table arranged at the first lateral delimitation;
wherein the wash table has a horizontal surface and a lining arrangement extending from the horizontal surface in a direction toward the floor, thereby creating a wash table lining surface,
wherein the lining arrangement comprises an indentation in a region facing the toilet, and the lining arrangement is indented in a direction facing away from the first vertical plane into a space underneath the wash table, and
wherein the indentation is created in a base surface of the lining arrangement and is delimited by a contour comprising a reverse L-shape, which has a substantially horizontal section that at least partially follows a horizontal extension direction of the toilet in a vertical upward direction relative to the toilet and from the front end toward the back end of the toilet, which substantially horizontal section bends into a mainly vertical section arranged in a forward direction relative to the toilet, providing leg room in form of the indentation for a downwardly bent leg of a user sitting on the toilet, positioned between the toilet and the wash table lining surface.

16. The aircraft of claim 15, further comprising:
a second lateral delimitation, which is directly opposed to the first lateral delimitation, wherein the toilet is arranged between the first lateral delimitation and the second lateral delimitation,
wherein the inner distance between the first lateral delimitation and the second lateral delimitation in a region along intersecting with the toilet is less than 75 cm.

17. The aircraft of claim 15, further comprising:
wherein the horizontal surface of the wash table protrudes over the indentation in a direction facing away from the first lateral delimitation, and
wherein a water supply and/or removal equipment, which is installed behind the lining arrangement in a space between the horizontal surface, the indentation contour and an outer delimitation of the lining arrangement facing away from the toilet.

18. The aircraft of claim 17, further comprising:
a water heater, which is installed behind the lining arrangement in a space between the horizontal surface, an outer delimitation of the lining arrangement facing away from the toilet, and the mainly vertical section of the indentation contour, and
at least one holder for toilet paper, which is installed in the lining arrangement in a space between the horizontal surface, an outer delimitation of the lining arrangement facing away from the toilet and the mainly vertical section of the indentation contour.

19. The aircraft of claim 18, further comprising:
wherein the horizontal surface comprises a curved shape defining a depth of the horizontal surface in relation to the first delimitation, which depth increases in a direction facing away from the toilet up to a maximum, and
wherein the indentation extends along a part of a longitudinal extension of the toilet.

20. The aircraft of claim 19, further comprising:
at least one holder for toilet paper, which is installed in the lining arrangement in a space between the horizontal surface, an outer delimitation of the lining arrangement facing away from the toilet and the mainly vertical section of the indentation contour,
wherein the horizontal surface comprises a curved shape defining a depth of the horizontal surface in relation to the first delimitation, which depth increases in a direction facing away from the toilet up to a maximum, and
wherein the indentation extends along a part of a longitudinal extension of the toilet, wherein the wash table comprises a placement space,
a handle distanced to the horizontal surface above an end region of the wash table that faces away from the toilet, and
wherein the entrance opening is directly opposed to the toilet and directly adjoins an end region of the wash table that faces away from the toilet.

* * * * *